United States Patent [19]

Wright

[11] Patent Number: 5,087,846
[45] Date of Patent: Feb. 11, 1992

[54] SUBMERSIBLE MOTOR HOUSING

[76] Inventor: John J. Wright, 9 Hix Ave., Rye, N.Y. 10580

[21] Appl. No.: 627,953

[22] Filed: Dec. 17, 1990

[51] Int. Cl.$^5$ .................. H02K 5/12; F04B 35/04
[52] U.S. Cl. .................. 310/87; 310/85; 310/89; 310/88; 310/64; 417/365
[58] Field of Search .......... 310/87, 85, 89, 59, 310/64, 88; 417/424.1, 424.2, 423.1, 423.3, 423.8, 423.15, 365

[56] References Cited

U.S. PATENT DOCUMENTS

| | | | |
|---|---|---|---|
| 4,126,406 | 11/1978 | Traylor et al. | 417/367 |
| 4,409,504 | 11/1983 | Wilson et al. | 310/87 |
| 4,436,488 | 3/1984 | Witten | 310/87 |
| 4,749,894 | 7/1988 | Iwata et al. | 310/87 |

Primary Examiner—R. Skudy
Assistant Examiner—Matthew Nguyen
Attorney, Agent, or Firm—John F. Ohlandt

[57] ABSTRACT

A submersible motor housing comprising: a base plate securely disposed between a motor device and a gear casing; a lower housing member disposed about the motor device and affixed to the base plate; a first gasket means disposed between the base plate and the lower housing member to ensure a water-tight seal therebetween; an upper housing member disposed about the top portion of the motor device and removably affixed to the lower housing member; and a second gasket means disposed between the lower housing member and the upper housing member to ensure a water-tight seal therebetween.

9 Claims, 4 Drawing Sheets

SUBMERSIBLE MOTOR HOUSING

The present invention relates to a novel submersible motor housing capable of preventing contaminants such as water from causing the housed motor device to fail or malfunction. This housing is particularly useful in protecting climber screen motor devices used in sewage treatment facilities from periodic flooding.

BACKGROUND OF THE INVENTION

Motors associated with climber or bar screens in sewage treatment plants are subject to periodic flood conditions which submerge the motors and brakes. Because the motors are of explosion proof design, when submergence occurs, water enters the unit resulting in eventual failure of the motor and the associated brake.

It would be highly desirable to have a motor which remains water-tight when submerged, thereby avoiding motor or brake failure. The present inventor has developed a unique submersible motor housing which avoids motor and brake failure during submergence in water. The submersible motor housing is also capable of dissipating heat generated from the motor. It also provides service personnel with easy access to the contained motor and brake for periodic lubrication.

It is a further object of the present invention to provide a housing with easy access to the connecting bolts and one in which the housing may be removed without disturbing the existing wiring or power connections to the motor.

It is also an object of the present invention to provide a housing with means for monitoring the interior temperature and pressure of the housing.

The present invention also provides many additional advantages which shall become apparent as described below.

SUMMARY OF THE INVENTION

A submersible motor housing comprising: a base plate securely disposed between a motor device and a gear casing; a lower housing member disposed about the motor device and affixed to the base plate; a first gasket means disposed between the base plate and the lower housing member to ensure a water-tight seal therebetween; an upper housing member disposed about the top portion of the motor device and removably affixed to the lower housing member; and a second gasket means disposed between the lower housing member and the upper housing member to ensure a water-tight seal therebetween.

The base plate includes a recessed portion adjacent to the motor device, such that the end of the motor device disposed opposite to the gear casing is mounted into the recessed portion of the base plate. The base plate, motor device, and gear casing are preferably bolted together.

The upper and lower housing members include exterior vanes for heat dissipation. The upper housing member has a temperature gauge and a pressure test port disposed in a top portion thereof for monitoring the interior conditions of the housing. The lower housing member has a lower flanged end disposed opposite the base plate. The lower flanged end, base plate and first gasket means are preferably bolted together. Similarly, the lower housing member has an upper flanged end disposed opposite a lower flanged end of the upper housing member. The upper flanged end of the lower housing member, the lower flanged end of the upper housing member and the second gasket means are preferably bolted together.

Other and further objects, advantages and features of the present invention will be understood by reference to the following specification in conjunction with the annexed drawings, wherein like parts have been given like numbers.

DESCRIPTION OF THE PREFERRED EMBODIMENTS

Figure 1:
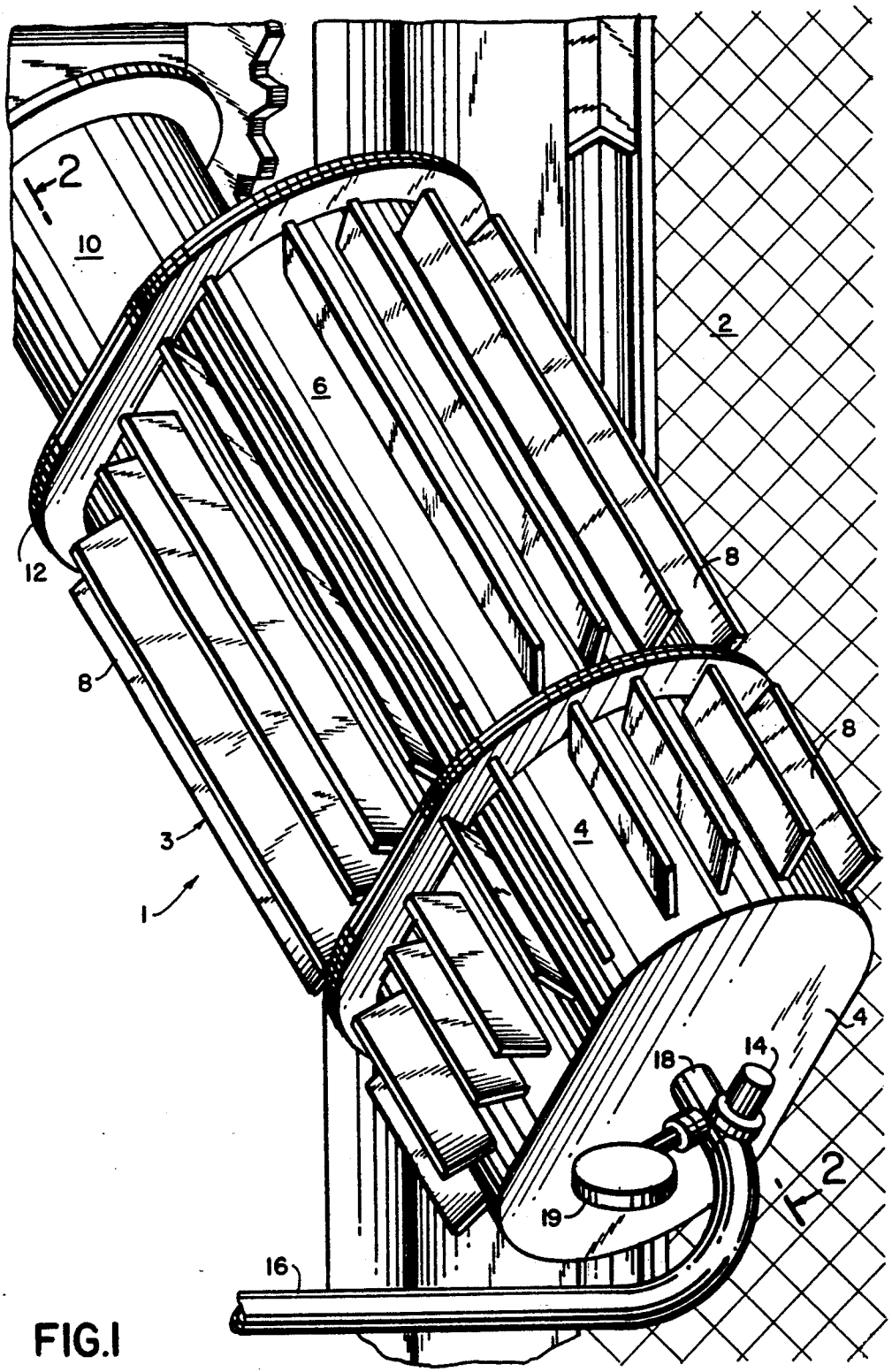
FIG. 1 is a schematic representation of a perspective view of a submersible motor housing in accordance with the present invention.

The context of the present invention is a motor device and gear casing assembly 1 deployed for driving a climber screen 2, as, for example, seen in FIG. 1. Such screens are used in various clean and dirty water sewage treatment plants. One such motor device is a Helical-Bevel Gearmotor sold by SEW Eurodrive of Lyman, S.C., U.S.A. This is an electrical drive motor which is explosion proof and has a squirrel cage induction brake motor.

The submersible motor housing according to the present invention can best be described by referring to the accompanying drawings, wherein FIG. 1 is a schematic representation of housing 3 having upper housing member 4 and lower housing member 6. Vanes 8 are disposed about the exteriors of upper housing member 4 and lower housing member 6 to permit heat generated by the contained motor to dissipate therethrough into the atmosphere.

Housing 3 is mounted about the motor device by means of base plate 12 which is securely disposed between the motor device and gear casing 10. In particular, lower housing member 6 is affixed to base plate 12 by any conventional means. Upper housing member 4 is removably affixed to lower housing member 6 by any conventional means, such as bolts. A temperature gauge 14 is disposed on the top portion of upper housing member 4 in order to monitor the interior temperature of housing 3. A conduit or pipe 16 conducts air under pressure to the interior of housing 3 for testing the sealing provided, the upper housing 4 being provided with a test port 18. A pressure gauge 19 measures the pressure.

Figure 2:
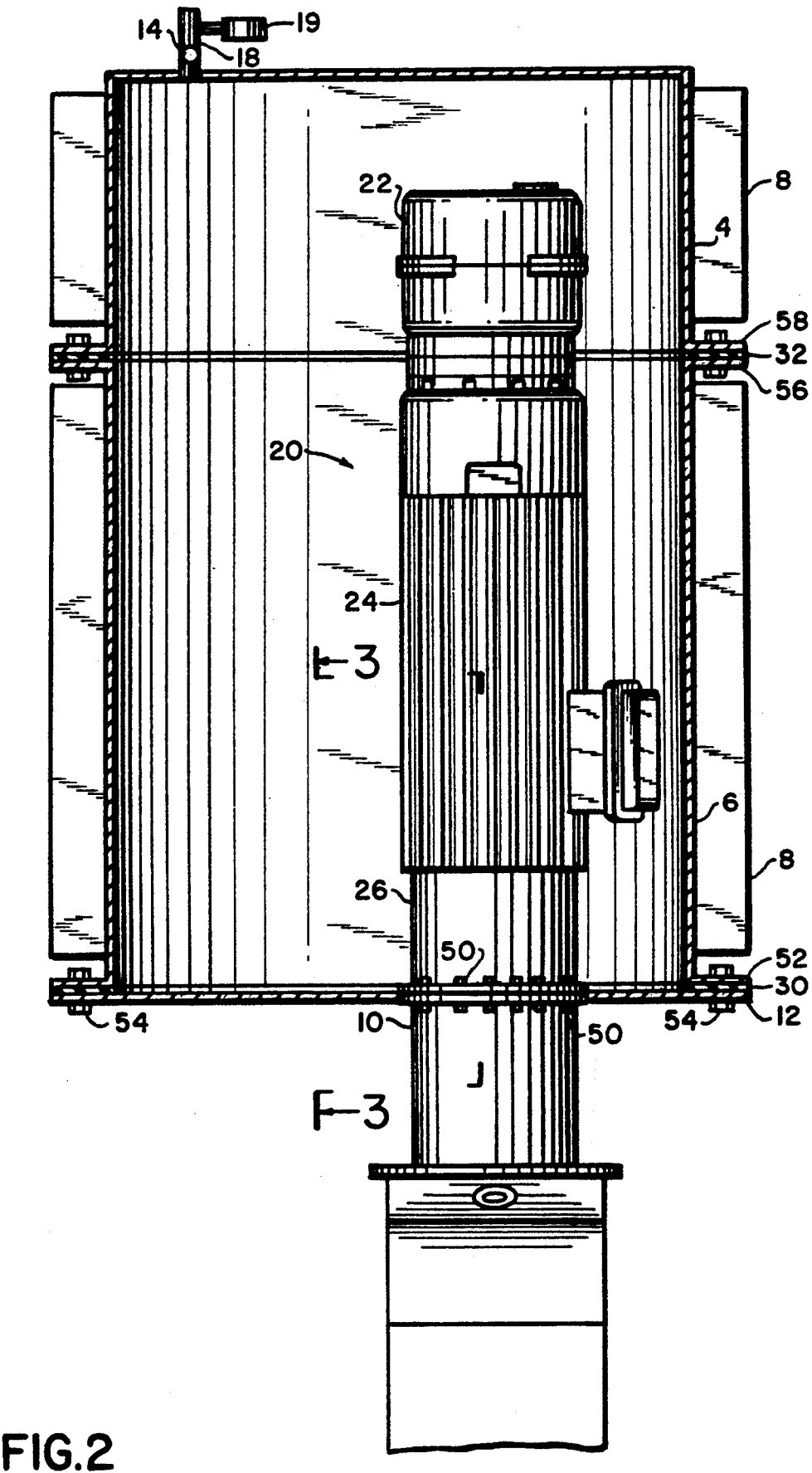
FIG. 2 is a cross-sectional view along line 2—2 of FIG. 1 which depicts a motor and brake disposed within the submersible motor housing.
Figure 4:
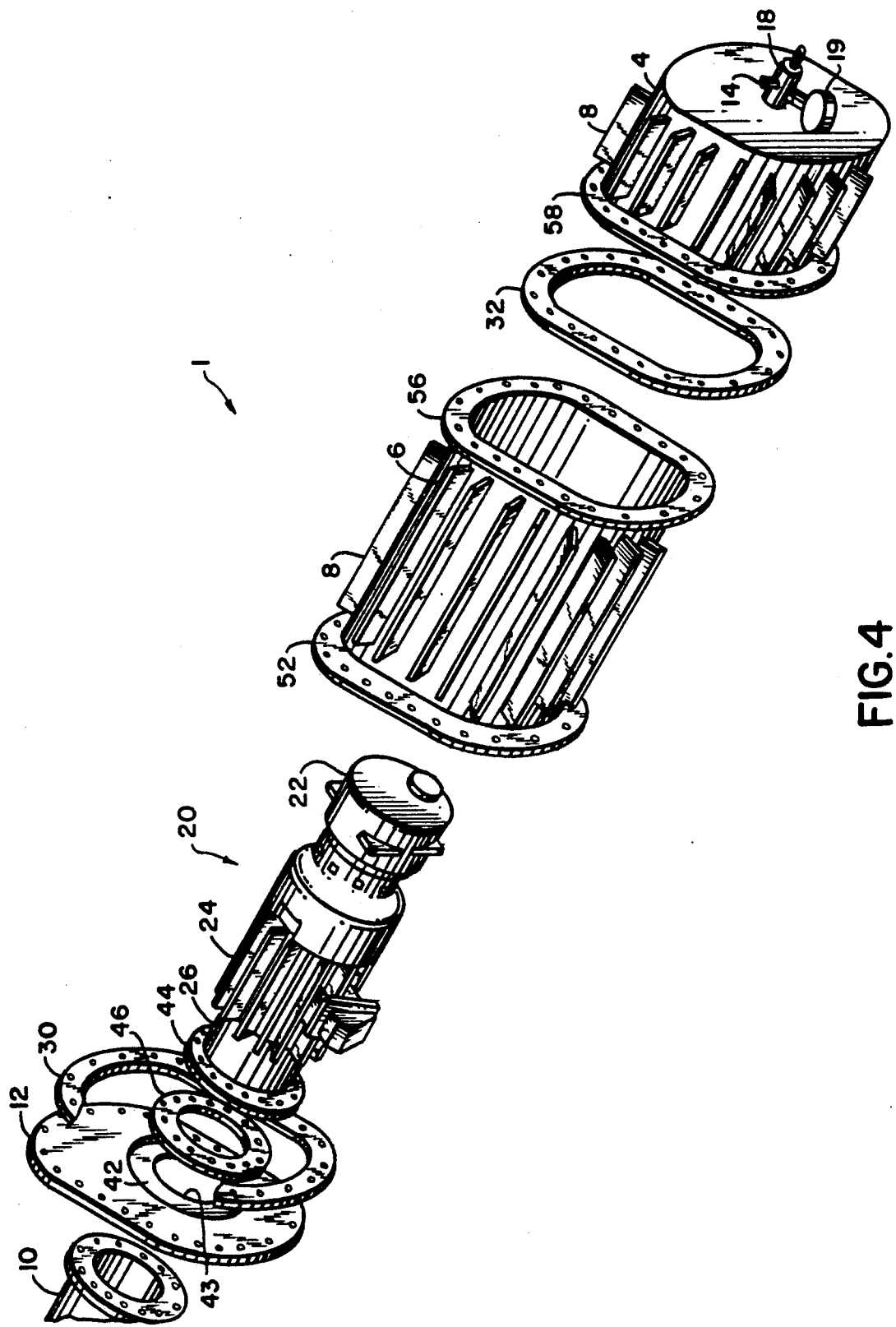
FIG. 4 is an exploded view of the submersible motor housing in accordance with the present invention.

A motor device 20 is contained within housing 3 is particularly seen in FIGS. 2 and 4. Motor device 20 may include electromagnetic brake 22, motor 24 and bearing system 26. In accordance with the present invention base plate 12 is securely disposed between motor device 20 and gear casing 10. Lower housing member 6 is disposed about motor device 20 and affixed to base plate 12. A first gasket means 30 is disposed between base plate 12 and lower housing member 6 to ensure a water-tight seal therebetween. The upper housing member 4 is disposed about the top portion of motor device 20 and removably affixed to lower housing member 6. A second gasket means 32 is disposed between lower housing member 6 and upper housing member 4 to ensure a water-tight seal therebetween.

In order to avoid corrosion due to the harsh environment to which the submersible motor housing will be exposed, it is preferable that upper and lower housing members (4, 6) are formed of 316 stainless steel. Vanes 8 affixed to the exterior of upper and lower housing members (4, 6) should also be formed of 316 stainless steel so as to resist corrosion, such vanes providing a satisfactory means for heat dissipation.

Figure 3:
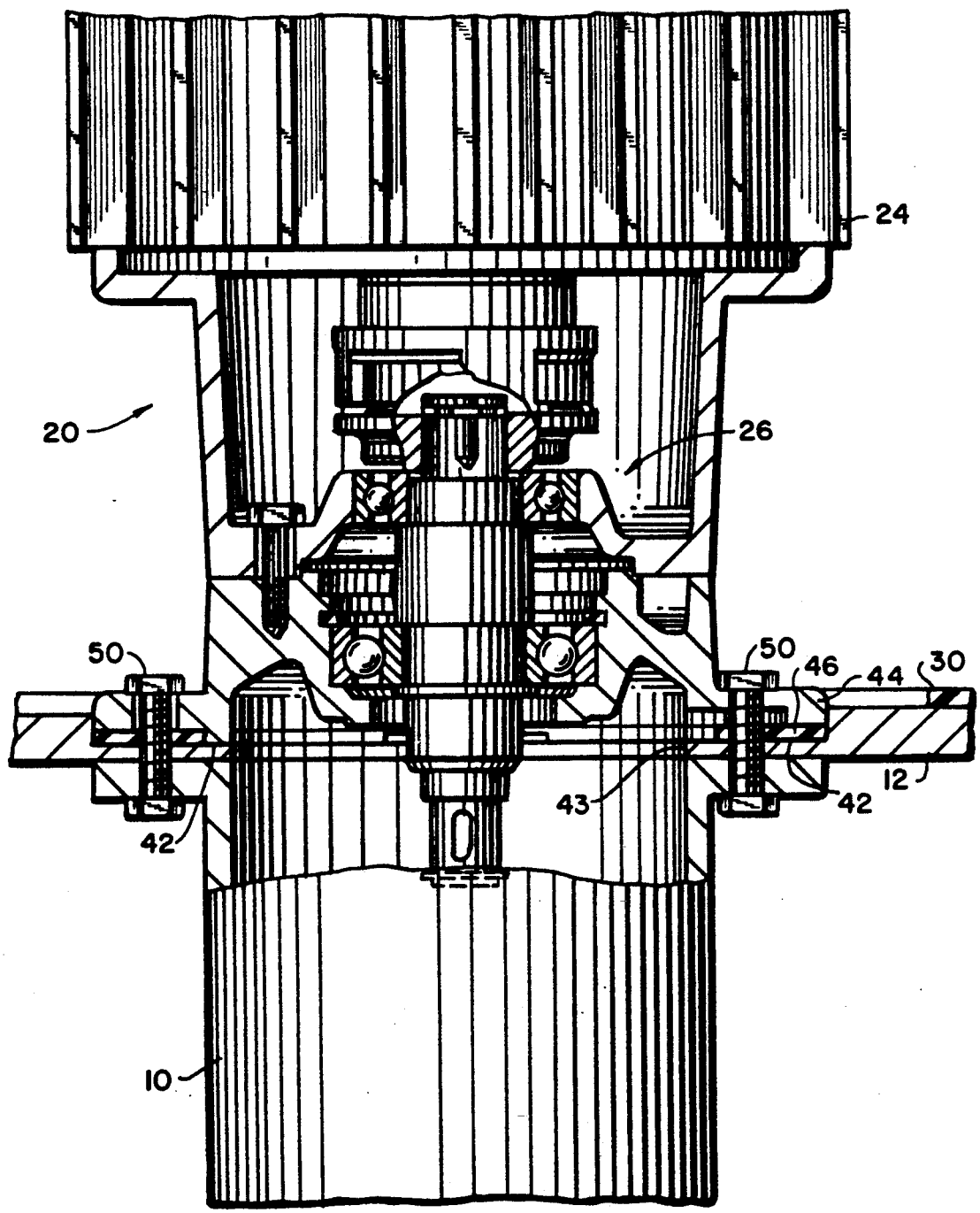
FIG. 3 is a cross-sectional view along line 3—3 of FIG. 2 which depicts a bearing system of the motor and the connection of the base plate to the motor and gear casing.

As graphically depicted in FIG. 4, base plate 12 is preferably oblong in shape, although any shape suitable for satisfactorily covering motor device 20 is also contemplated. Base plate 12 includes a recessed portion 42, surrounding a thru-opening 43, adjacent to a round plate 44 of motor device 20, such that round plate 44 is mounted into recessed portion 42. It may also be desirable to dispose a gasket 46 between round plate 44 and recessed portion 42 to ensure a water-tight seal therebetween. As shown in FIG. 3, base plate 12, motor device 20 and gear casing 10 are securely affixed together by means of bolts 50.

Lower housing member 6 has a lower flanged end 52 juxtaposed to base plate 12, wherein lower flanged end 52, base plate 12 and first gasket means 30 are affixed together by means of bolts 54 (FIG. 2).

Lower housing member 6 also has an upper flanged end 56 which is juxtaposed to lower flanged end 58 of upper housing member 4, wherein upper flanged end 56, lower flanged end 58 and second gasket means 32 are removably affixed together by means of bolts (not shown). In this manner service personnel can readily service motor device 20 by simply removing the bolts between upper flanged end 56 and lower flanged end 58 and removing upper housing member 4.

It will be understood that the internal wiring between the brake, motor, and external junction box is in explosion-proof conduit and sealed to prevent any moisture or gases from entry.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claims.

I claim:

1. A submersible motor housing for a climber screen motor assembly and a gear casing assembly comprising:
   a base plate securely disposed between said motor assembly and said gear casing assembly, wherein said base plate, said motor assembly and said gear casing assembly are secured together;
   a lower housing member disposed about said motor assembly and affixed to said base plate;
   a first gasket means disposed between said base plate and said lower housing member to ensure a water-tight seal therebetween;
   an upper housing member disposed about a top portion of said motor assembly and removably affixed to said lower housing member;
   a second gasket means disposed between said lower housing member and said upper housing member to ensure a water-tight seal therebetween; and
   said upper and lower housing members including exterior vanes for heat dissipation.

2. The submersible motor housing according to claim 1, wherein said motor assembly comprises at least a brake, a motor and a bearing system.

3. The submersible motor housing according to claim 1, wherein said upper and lower housing members are formed of 316 stainless steel.

4. The submersible motor housing according to claim 1, wherein said upper housing member has a temperature gauge disposed in a top portion thereof.

5. The submersible motor housing according to claim 1, wherein said upper housing member has a pressure test port disposed in a top portion thereof.

6. The submersible motor housing according to claim 1, wherein said base plate is preferably oblong in shape.

7. The submersible motor housing according to claim 1, wherein said base plate includes a recessed portion adjacent to said motor assembly, whereby the end of said motor assembly disposed opposite to said gear casing assembly is mounted into the recessed portion of said base plate.

8. The submersible motor housing according to claim 1, wherein said lower housing member has a lower flanged end disposed opposite said base plate, and wherein said lower flanged end, said base plate and said first gasket means are bolted together.

9. The submersible motor housing according to claim 1, wherein said lower housing member has an upper flanged end disposed opposite a lower flanged end of said upper housing member, and wherein the upper flanged end of said lower housing member, the lower flanged end of said upper housing member and said second gasket means are bolted together.

* * * * *